(12) United States Patent
Bennett

(10) Patent No.: US 8,476,523 B2
(45) Date of Patent: Jul. 2, 2013

(54) SOLAR PANEL READY TILES

(75) Inventor: James D. Bennett, Hroznetin (CZ)

(73) Assignee: Enpulz, L.L.C., Chicago, IL (US)

( * ) Notice: Subject to any disclaimer, the term of this patent is extended or adjusted under 35 U.S.C. 154(b) by 622 days.

(21) Appl. No.: 12/197,720

(22) Filed: Aug. 25, 2008

(65) Prior Publication Data

US 2010/0043319 A1    Feb. 25, 2010

(51) Int. Cl.
    *H02N 6/00* (2006.01)
(52) U.S. Cl.
    USPC ............................ 136/251; 136/244; 136/243
(58) Field of Classification Search
    USPC ........................................... 320/101; 136/251
    See application file for complete search history.

(56) References Cited

U.S. PATENT DOCUMENTS

| | | | | |
|---|---|---|---|---|
| 5,768,831 A | * | 6/1998 | Melchior | 52/173.3 |
| 6,489,552 B2 | * | 12/2002 | Yamawaki et al. | 136/251 |
| 6,856,496 B1 | * | 2/2005 | Mucci et al. | 361/20 |
| 2003/0047209 A1 | * | 3/2003 | Yanai et al. | 136/291 |
| 2007/0103108 A1 | * | 5/2007 | Capp et al. | 320/101 |
| 2007/0157963 A1 | * | 7/2007 | Metten et al. | 136/251 |
| 2008/0142071 A1 | * | 6/2008 | Dorn et al. | 136/245 |

FOREIGN PATENT DOCUMENTS

FR    2478167 A  *  9/1981

* cited by examiner

*Primary Examiner* — Jennifer Michener
*Assistant Examiner* — Marla D McConnell
(74) *Attorney, Agent, or Firm* — Garlick & Markison; Bruce E. Garlick

(57) ABSTRACT

A roofing tile solar power generation system includes an array of solar panel ready tiles installed upon the roof of a house and that delivers power to a central control unit and that may be controlled either locally by a computing system or remotely via a server. The solar panel ready tiles include a solar panel ready tile body having a cavity to receive a solar panel and electrical connects to service same. The solar panel ready tile includes communication pathway connection plugs. The cavity receives a solar panel. A cover may protect the solar panel or the cavity prior to installation of the solar panel. The solar panel ready system may also optionally have sub-panel control system, consisting of one or more of their own power bus interface, communication interface, memory, power status indicators and lighting modules, plurality of sensors and a processing unit.

18 Claims, 9 Drawing Sheets

SOLAR PANEL READY TILES

BACKGROUND

1. Technical Field

The present invention relates generally to electrical power generation and more particularly to photo voltaic electrical power generation.

2. Related Art

Today, most of the electrical power generated that is used to light and heat houses and buildings is derived from coal, petroleum, hydro electric dams, nuclear power, wind power, ocean current power and so forth. The electrical power is generated at a power plant by utility companies and delivered to end users via transmission lines and distribution lines. The electrical power is distributed within homes and businesses at usable voltages. Power meters measure power consumed and a utility company bills the end user for such consumed power.

Most currently used techniques for generating electrical power have a fuel cost. All facilities for generating electrical power have a facility cost. Further, the cost of transmission and distribution lines is substantial. Power loss during transmission of the electrical power from the power plants to the end users can be substantial. As electrical power consumption continues to increase additional facilities must be constructed to service the increase in demand.

Fossil fuels, such as petroleum and coal that produce most electrical energy are non-renewable. The price of these natural resources continues to increase. In cases of hydro electric power generation, the available electric output depends entirely upon natural circumstances such as rain fall. For instance, during years when rainfall is low, power generation is also low, which affects the entire community who use this source of electrical power. Wind power is typically only available during daylight hours and fluctuates both seasonally and based upon local weather patters. In the case of nuclear power, the technology is expensive, construction of power generating stations is expensive, and nuclear hazards cannot entirely be ruled out, in spite of extensive safeguards. Nuclear power generation is not available in many regions of the world because of security concerns.

In addition, adverse environmental effects from all of these power generation methods is enormous. In other words, each of these power generation methods has its own adverse environmental effects such as hydro electric dams adversely affecting bio-diversity and possibly causing floods of enormous destruction should a dam burst. The wind power generation takes huge amounts of land and may be aesthetically unpleasant. Coal and petroleum generation causes environmental degradation in the form of carbon dioxide and toxic emissions, causing enormous adverse effects on natural weather cycles, having damaging effects on life as a whole in the planet, in the long run. Similarly, nuclear waste can be hazardous; disposing them is very expensive and also has ability to have an adverse effect on the environment.

Moreover, with all of these above mentioned circumstances of power generation and environmental adverse affects, the average user's ability to contribute to improve the situation is next to nothing. So, the average consumer is helpless regarding these issues. Scientists for long have known that earth's only major renewable resource, as far as life is concerned, is the energy coming from sun.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
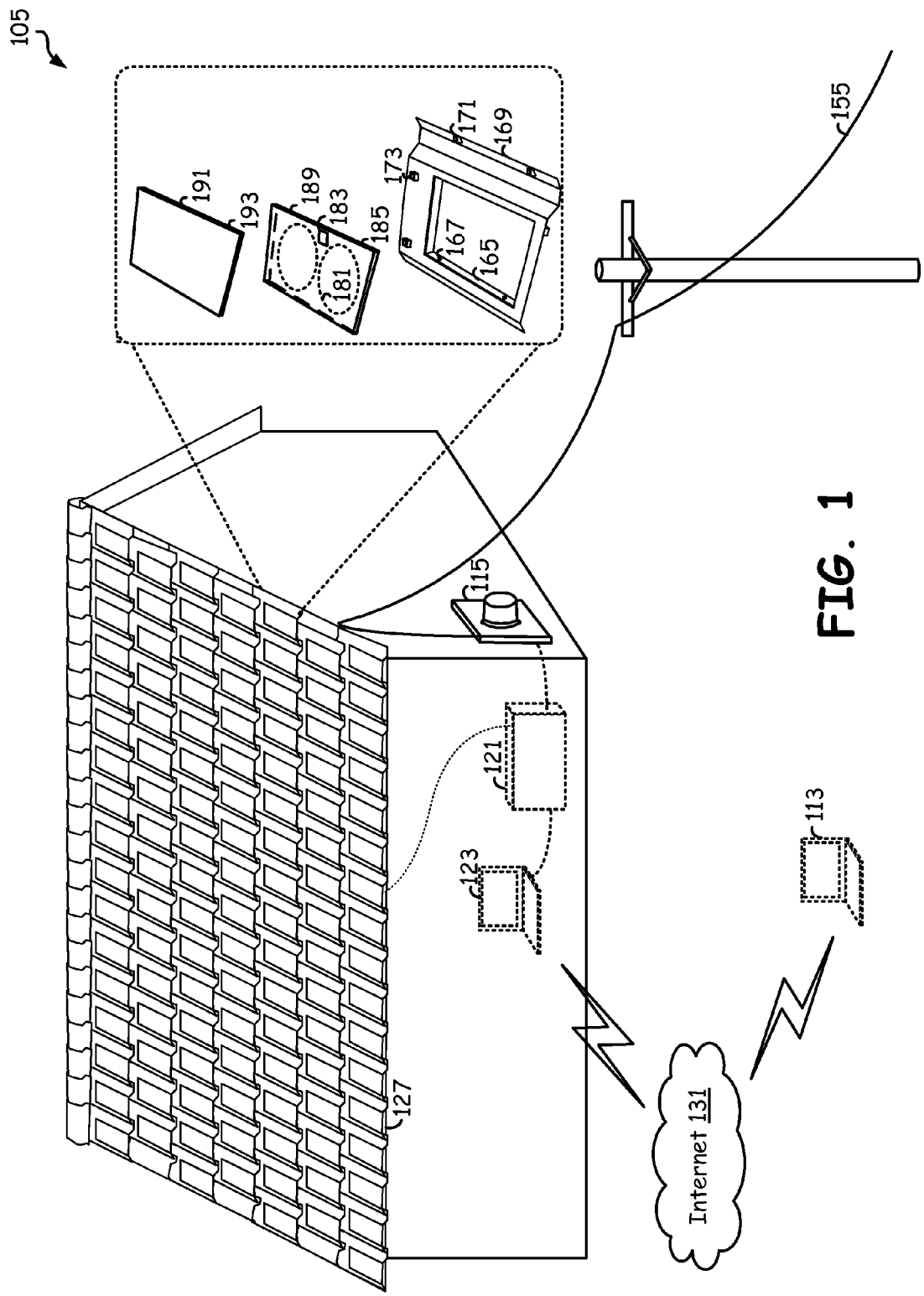
FIG. 1 is a perspective diagram illustrating a roofing tile solar power generation system, with solar panel ready tiles, installed upon the roof of a house, that delivers power to a central control unit, which may be controlled either locally by a computing system or remotely via a server associated it; wherein the computing system or server displays status with operational control options and controls delivery of electrical power to the house or external power grid.

FIG. 1 is a perspective diagram illustrating a roofing tile solar power generation system 105 with solar panel ready tiles 127 installed upon the roof of a house, that delivers power to a central control unit 121 (or other power coupling), which may be controlled either locally by a computing system 123 or remotely via a server 113; wherein the computing system 123 or server 113 displays status with operational control options and controls delivery of electrical power to the house 115 or external power grid 155. In specific, at the center of the solar panel power generation system 105, lies a specialized Solar Panel Ready Tile (SPRT) body 169 containing a cavity (slot or docking system) 165 that permanently or removably houses a solar panel unit (or replaceable photovoltaic module) 185 and water proof solar panel outer lid (or removable covering) 193 that permanently or removably seals the cavity (or docking system) 165.

Many types of solar panel ready tile bodies 169 are envisaged (refer to the FIGS. 2, 3, 4, 5 and 6 for detailed descriptions), in accordance with the present invention. In different embodiments, the solar panel ready tile bodies 169 may come in variety of shapes and materials, having one or more of features of a cavity (slot or docking system) 165 to receive solar panel units 185 removably or permanently, self-cleaning brush system (not shown), panel array power bus and panel array communication pathway connection plugs within the cavity 167 and extremities 171 and 173 of the tile.

The solar panel unit 185 may contain any kind of solar energy based power generation cells, such as arrays of photovoltaic cells, and may be permanently sealed within the solar panel ready tile body 169, along with a water proof solar panel outer lid (or covering) 193. Alternatively, the solar panel unit 185 may be removable, with a screw-in system, snap-in system, or slide-in system of attachment to the cavity (slot or docking system) 165 of the solar panel ready tile body 169, along with similar arrangements of attaching and removing an external (transparent) water proof solar panel outer lid (or covering) 193. While the solar panel unit 185 may lay inside the cavity (slot or docking system) 165 of the solar panel ready tile body 169 (invisible to an external observer from outside of the house), the external (transparent) water proof solar panel outer lid (or covering) 193 may elegantly attach to the exterior of the cavity (slot or docking system) 165 in such a manner that it matches the solar panel ready tile body 169 and enhances the elegant looks of the house roofing, in contrast to the rest of the house.

In addition, the cavity (slot or docking system) 165 of the solar panel ready tile body 169 contains connection plugs at the interior of the cavity (at the left side, right side, top side and/or bottom side) 167 and at the extremities (at the left and right sides, top side and bottom side) 171 and 173, such that while placing the solar panel unit 185 inside this cavity 165, these connection plugs 167 at the interior of the cavity 165 automatically attach (snap-in) to the solar panel unit's 185 connection plugs (which are of opposing types, and come in standard sizes and locations of the solar panel unit 185) 189. In addition, the connections plugs at the interior 167 of the cavity 165 are connected to the connections plugs at the extremities 171 and 173 of the solar panel ready tile body 169 via concealed internal wiring cables.

Thus, the connection plugs 167 at the interior of the cavity (or docking system) 165 and extremities 171 and 173 of the solar panel ready tile body 169 (which in turn plug into the neighboring tiles, at left and right sides, top and bottom) make the entire solar panel ready tiled roof being interconnected, so that from any one corner of the roof top, the power may be extracted into the central control unit 121. In addition, the wiring may also be provided internally from the inner side of the of roofing, via battens (upon which some embodiments of the solar panel ready tiles are placed), either as exclusive wiring along the battens without having any connections plugs at the extremities 171 and 173 of the solar panel ready tile bodies 169 or as a redundant wiring system for longevity.

The connection plugs at the interior 167 of the cavity (or docking system) 165 and extremities 171 and 173 of the solar panel ready tile body 169 are used for a plurality of purposes such as panel array power bus, panel array communication pathways and/or panel array data pathways (each having its own connection plugs such as 165, 171 and 173), all of which finally connect to the central control unit 121. In addition, the extremities of the solar panel ready tile body 169 may have many redundant plugs such as 171 and 173, for one or more of panel array power bus, panel array communication pathways and/or panel array data pathways, to ensure secured connectivity (in case of one of the connection plugs damaged or so forth).

Alternatively, a single conductor pair or fewer conductors/ connections may be used for all of power delivery, communication signaling, and control signaling. In many embodiments, the power delivered by the solar panel unit 185 is direct current/direct voltage while communication and control signals are in higher frequency bands. In this case, a single conductor pair may service both power delivery and communication/control signaling. Further, a single conductor pair may service both communication and control signaling with another conductor pair servicing power delivery.

The solar panel unit 185, in one embodiment, may contain an array of Photo Voltaic Cells (PVC) 181 or any other solar power generation cells 181. Each of these PV cells 181 connects to a panel array power bus via a power bus driver (that safe guards PV cells in case of unexpected extremities in voltage surge due to lighting and so forth).

In one of the more advanced embodiments, the solar panel unit 185 may include: (i) An array of solar power generation cells 181; (ii) Power bus drivers; (iii) Hydraulic, stepper or motor controlled azimuth and altitude positional control units, attached to the solar panel board; (iv) Solar energy focusing lenses; (v) Cooling systems; (vi) Sub-panel array power busses; (vii) Sub-panel power connection plugs; (viii) Sub-panel communication pathways; (ix) Sub-panel communication connection plugs; (x) Sub-panel status indicator lighting modules and decoration lighting modules; (xi) Sub-panel sensor modules; (xii) Sub-panel snow thawing modules; (xiii) Sub-panel over load and fire response modules; and (xiv) Sub-panel control system 183.

An optional sub-panel control system 183 (that is part of the solar panel units 185 or that may be placed adjacent to the solar panel unit 185 on the same board, in some embodiments (refer to the FIG. 7 for detailed description) may consist of one or more of sub-panel power bus and communication interfaces, sub-panel processing unit, sub-panel memory, plurality of sub-panel of sensors and control interfaces, plurality of sub-panel of status indicator lighting, decoration lighting bulbs and control interfaces, sub-panel snow thawing heating elements and control interfaces, sub-panel azimuth and altitude control interfaces, sub-panel self cleaning rotational control interfaces, sub-panel performance monitoring, and sub-panel over loading and fire response control interfaces. Sub-panel performance monitoring may include the tracking of output voltage/current of the solar panel unit 185 over time to determine whether the performance of the solar panel unit 185 has degraded over time. Further, the sub-panel performance monitoring may include comparing the performance of the solar panel unit 185 to other solar panel units that form part of the installation 105. Each of the optional sub-panel control systems 183, in turn, may be individually programmed by the central control unit (via a computing system 123 or externally via servers 113) 121, for any of the above said functionalities.

In one embodiment, the central control unit 121 is electrically connects to each of the arrays of photo voltaic cells or any other solar power generation cells in each of the plurality of solar panel units 185 at the roof via the panel array power busses via power bus drivers, and the central control unit 121 may directly control each of the solar panel units 185. In another embodiment, the central control unit 121 is communicatively coupled to the optional sub-panel control system 183 of each of the plurality of solar panel units 185 and controls or programs the optional sub-panel control system 183, based upon selected operational settings.

The central control unit (refer to the FIG. 8 for detailed description) 121 may include one or more of a panel array power bus, communication and Internet pathway communication interfaces, a central processing unit with programmable control processing capabilities, memory units, battery arrays, power synchronization and regulation units and DC/AC Converters.

For example, an owner of the house may desire to reduce the cost of electricity by installing the roofing tile solar power generation system 105. So, the owner may contact a roofing tile solar power generation system 105 sellers/contractors, who in consultation with the owner decides upon the type of industry standard solar panel ready tiles 127 that fits with architectural and color schemes of the house. In addition, the solar panel unit 185 complexity (in terms of sub-panel control system, sensors, overload and lighting protections, snow thawing, self-cleaning and so forth) may be determined by the owner based upon cost and performance factors.

Then, the contractor replaces the solar panel ready tiles 127; and makes panel array power busses and panel array communication pathway inter-connections 167, 171, 173 and 189 and panel array power busses and panel array communication pathway wiring (and/or wiring along with battens) to the central control unit 121 and computing system 123. The connections, from the central control unit 121, are also made to the servers 113 via Internet pathway communication interface and Internet 131, and via panel array power busses to the central power junction 115. Thus, once the installation of the roofing tile solar power generation system 105 is ready and tested, the owner is given demonstration as to how to set operational control options in the computing system 123. The excess power generated, if any, may be delivered to neighborhood houses or to the main grid, in accordance with the arrangements made within the neighborhood or local utility company.

Figure 2:
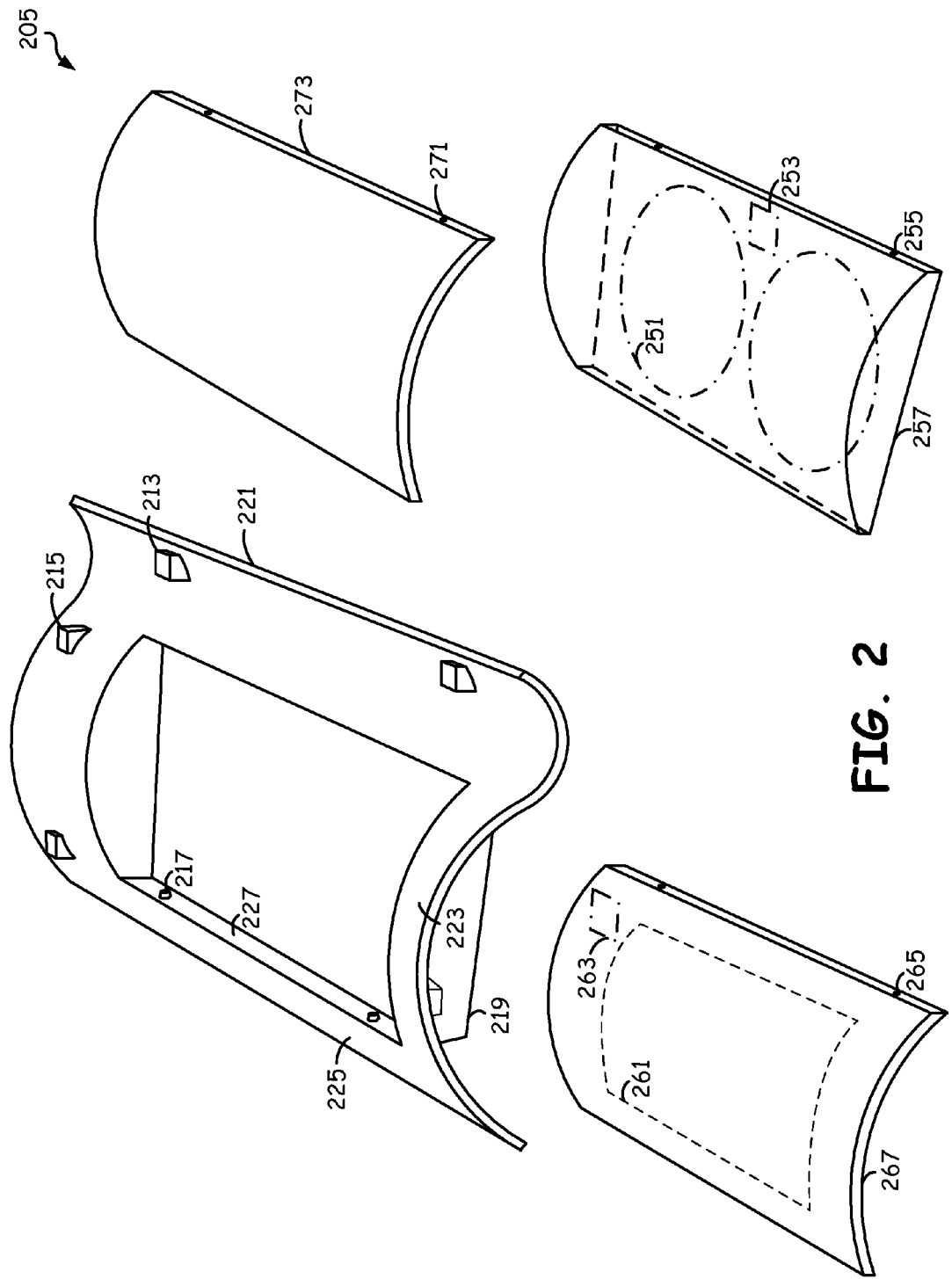
FIG. 2 is a perspective diagram, illustrating construction of a solar panel ready tile of FIG. 1; consisting of a solar panel ready tile body (with a cavity or a docking system to receive solar panel unit, power and communication pathway connection plugs within the cavity or docking system and extremities of the tile), two embodiments of solar panel units that snugly fits into the cavity or docking system (and optionally with capabilities of altitude and azimuth rotations) and a water proof solar panel outer lid, in accordance with an embodiment of the present invention.

FIG. 2 is a perspective diagram illustrating construction of a solar panel ready tile of FIG. 1; consisting of a solar panel ready tile body 221 (with a cavity or a docking system 227 to receive a solar panel unit 257, 267, power and communication pathway connection plugs within the cavity or docking system 217 and extremities 213, 215 of the tile), two embodiments of solar panel units 257 and 267 that snugly fit into the cavity or docking system 227 (and optionally with capabilities of altitude and azimuth rotations) and a water proof solar panel outer lid 273, in accordance with an embodiment of the present invention.

The solar panel ready tile body 221 may be made up of any of conventional tile body material such as clay, plastic or glass, but is specifically designed as a solar panel ready tile body 221 (as illustrated) that may comply with industry standard specifications. Each of the dimensional specifications of the solar panel ready tile body 221 (such as length, width, height, curvatures and the base or bottom side 219), solar panel units 257 and 267 (such as length, width and height) and water proof solar panel outer lid 273 (such as length, width, height and curvatures) is uniform and may be constructed according to industry standards. Similarly, each of the dimensional specifications (such as length, width and height) of the cavity or a docking system 227 that receives the solar panel unit 257 or 267 is also dimensionally set and may conform to industry standards. In addition, some of the solar panel ready tile bodies 221 that fit into the edges of the roof or on the top most edge of the roof may have slightly different designs from the one illustrated 221.

The power and communication pathway connection plug locations within the cavity or docking system 217 and/or at the extremities 213, 215 of the solar panel ready tile body 221 are may also be set as industry standards. The power and communication pathway connection plug locations within the cavity 217 may exist on all four sides, internal to the cavity or docking system 227. At the extremities of the solar panel ready tile body 221, besides the illustrated connection plugs 213 and 215, connection plugs may also exist at the bottom side of the other extremities 223 and 225 of the solar panel ready tile body 221. Thus, the power and communication pathway connection plugs 213, 215 (and below of 225 and 223) at the extremities of the solar panel ready tile body 221 electrically may attach to the neighboring tiles on all sides (top, bottom and left and right sides), some of which may be redundant connections. The internal wiring between the power and communication pathway connection plug locations within the cavity or docking system 217 and extremities 213, 215 (and below of 223 and 225) of the solar panel ready tile body 221 may be made during the assembly of the solar panel ready tile body 221, solar panel unit 257 or 267 and water proof solar panel outer lid 273 into a single solar panel ready tile.

In the illustration, two embodiments of solar panel units 257 and 267 that snugly fit into the cavity or docking system 227 are shown. While this fit may be snug, sealing material such as caulking, a sealing gasket, or other sealing material/structure may be required. While dimensions (such as length, width and height), power and communication pathway connection plug locations (top, bottom and left and right sides) 255 or 265, on the edges of the solar panel unit 257 or 267 respectively may be set as industry standards; the internal electronic design architecture of the solar panel unit 257 or 267 may vary widely. The internal electronic architecture may be decided by the corresponding manufacturer thought the illustration shows two such embodiments 257 and 267. The illustration of the solar panel units 257 and 267 show solar panel (photo voltaic cell) arrays 251 and 261, sub-panel control module 253 and 263 and connection plugs 255 and 265, respectively. The transparent and water proof solar panel outer lid 273 may be made up of glass or plastic materials, and has a snap-in 271 or screw-in attachment system; it removably attaches and seals the cavity or docking system 227, after the solar panel unit 257 or 267 is put in place inside the cavity or docking system 227.

Figure 3:
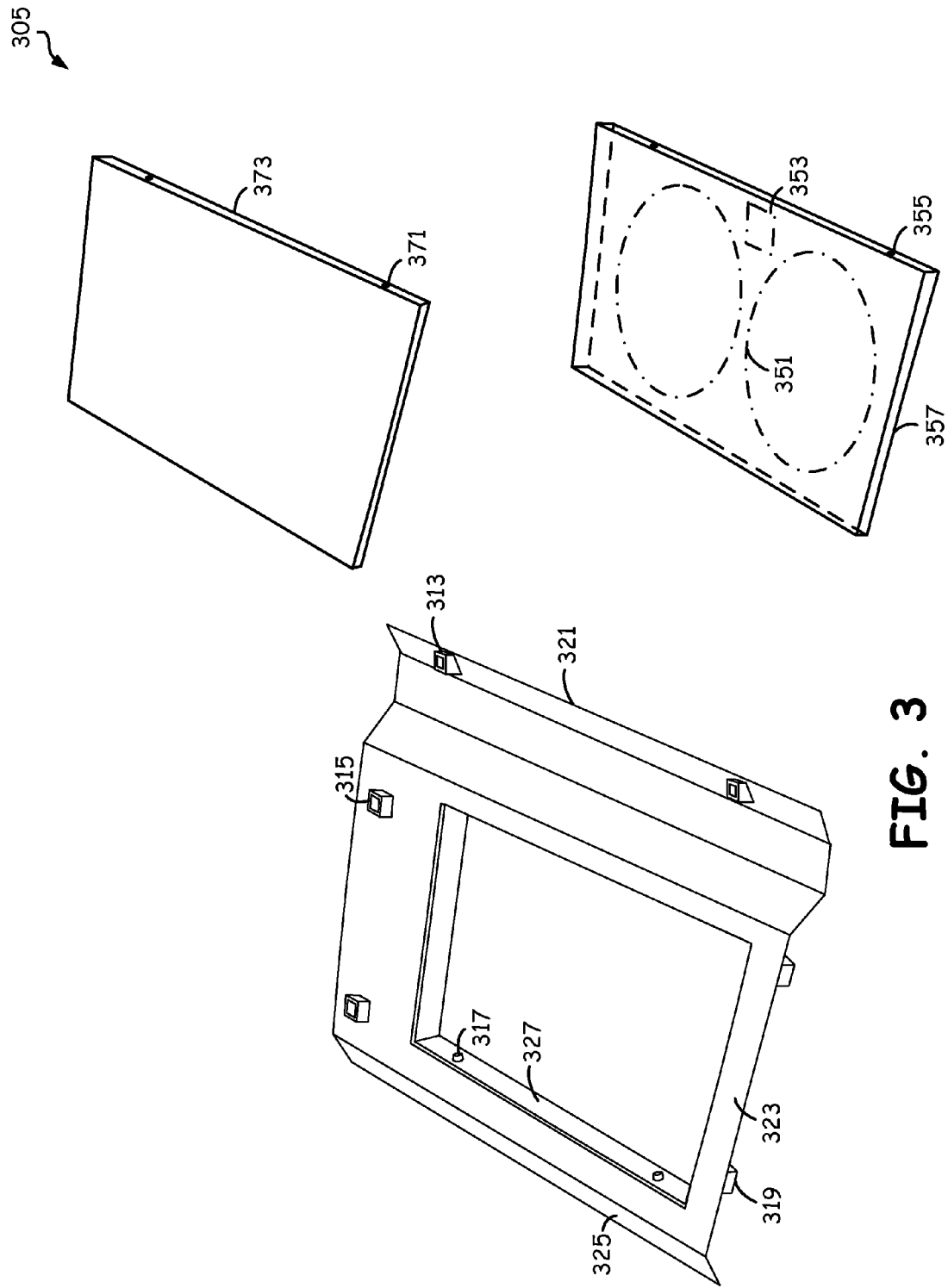
FIG. 3 is a perspective diagram illustrating construction of a solar panel ready tile of FIG. 1; consisting of a solar panel ready tile body (with a cavity or a docking system to receive solar panel unit, power and communication pathway connection plugs within the cavity or docking system and extremities of the tile), solar panel units that snugly fits into the cavity or docking system (and optionally with capabilities of altitude and azimuth rotation) and water proof solar panel outer lid, in accordance with an embodiment of the present invention.

FIG. 3 is a perspective diagram illustrating construction of a solar panel ready tile of FIG. 1; consisting of a solar panel ready tile body 321 (with a cavity or a docking system 327 to receive solar panel unit 357, power and communication pathway connection plugs 317 within the cavity or docking system 327 and/or or at extremities 313 and 315 of the tile), solar panel unit 357 that snugly fits into the cavity or docking system 327 (and optionally with capabilities of altitude and azimuth rotations) and water proof solar panel outer lid 373, in accordance with an embodiment of the present invention.

The solar panel ready tile body 321, of this embodiment, may be made up of any of the usual tile body materials that are commercially available (such as clay, plastic or glass), but each of the dimensional specifications (such as length, width, height, base or bottom side design and dimensions 319 and other design specifications) of the solar panel ready tile body 321 is set and may be manufactured according to standard dimensions. Similarly, each of the dimensional specifications (such as length, width, and height) of the cavity or a docking system 327 that receives the solar panel unit 357 is also set from tile to tile. In addition, some of the solar panel ready tile bodies 321 that fit into the edges of the roof or on the top most edge of the roof may have slightly different designs from the one illustrated 321.

The power and communication pathway connection plug locations (on all four sides) within the cavity or docking system 317 and extremities (on all four sides; 313, 315, below of 323 and 325) of the solar panel ready tile body 321 are also set as industry standards. Thus, the power and communication pathway connection plugs 313, 315 (and below of 323 and 325) at the extremities of the solar panel ready tile body 321 electrically attach to the neighboring tiles on all sides (top, bottom and left and right sides). The internal wiring between the power and communication pathway connection plug locations within the cavity or docking system 317 and extremities 313, 315 (and below of 323 and 325) of the solar panel ready tile body 321 may be made during the assembly of the solar panel ready tile body 321, solar panel unit 357 and water proof solar panel outer lid 373, into a single solar panel ready tile.

The solar panel unit 357 that snugly fits into the cavity or docking system 327 may be manufactured in standard dimensions of length, width and height, with top, bottom and left and right side power and communication pathway connection plug locations 355 are set. However, internal electronic design architecture of the solar panel unit 357 may vary widely and may depend on the corresponding manufacturers. The illustration of the solar panel unit 357 shows solar cell (photo voltaic cell) arrays 351, sub-panel control module 353 and connection plugs 355.

Each of the dimensional specifications (such as length, width, and height) of the transparent and water proof solar panel outer lid 373 may be set as an industry standard. The transparent and water proof solar panel outer lid 373 may be made up of glass or plastic materials. The transparent and water proof solar panel outer lid 373 has a snap-in or screw-in 371 attachment system, and it removably attaches and seals the cavity or docking system 327, after the solar panel unit 357 is put in place inside the cavity or docking system 327.

Figure 4:
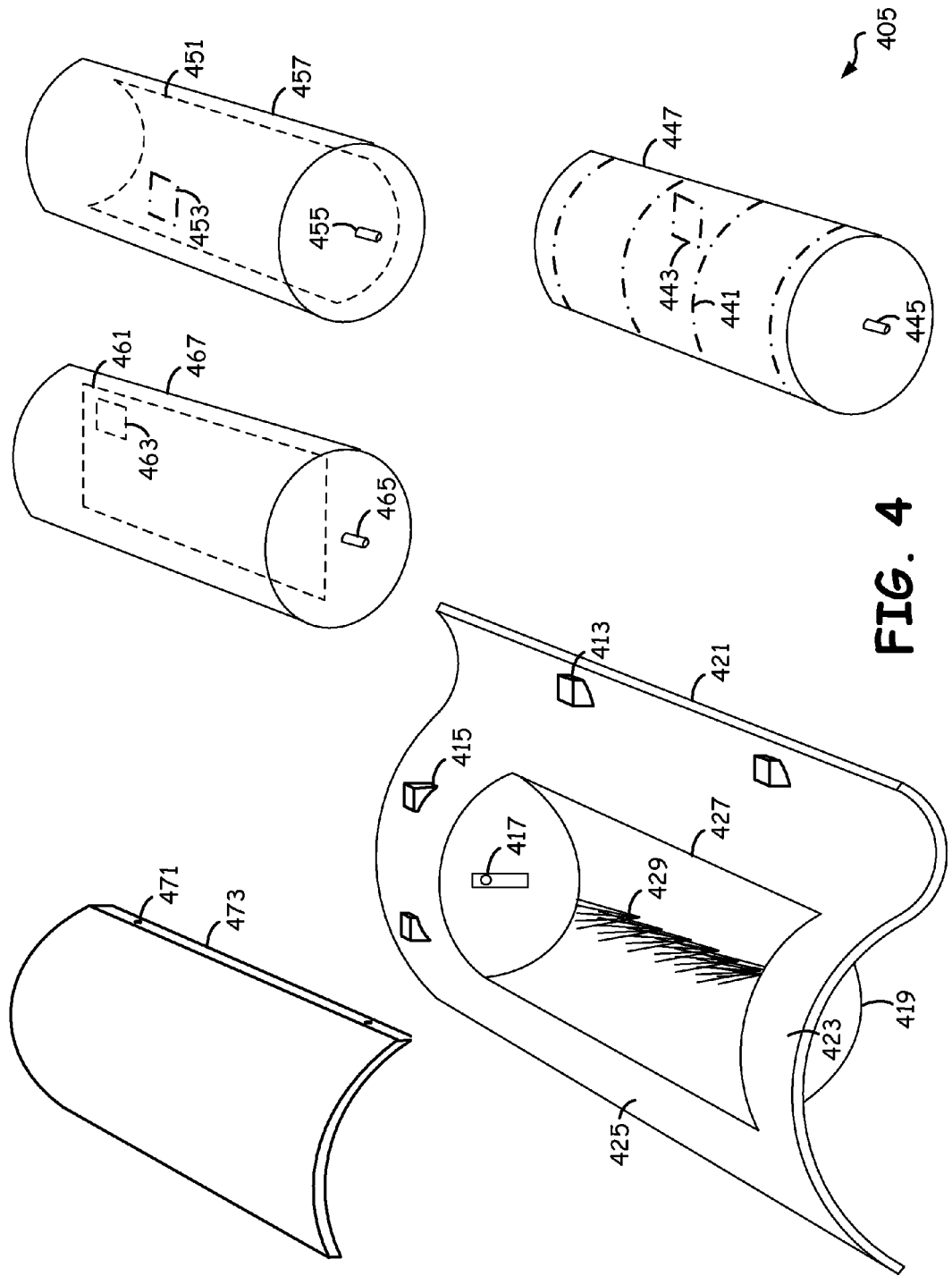
FIG. 4 is a perspective diagram illustrating construction of a solar panel ready tile of FIG. 1; consisting of a solar panel ready tile body (with a cavity or a docking system to receive solar panel unit, self-cleaning brush system, power and communication pathway connection plugs within the cavity or docking system and extremities of the tile), three embodiments of solar panel units with capabilities of self-rotation for self-cleaning (and optionally with capabilities of altitude and azimuth rotations) that snugly fit into the cavity or docking system and a water proof solar panel outer lid, in accordance with an embodiment of the present invention.

FIG. 4 is a perspective diagram illustrating construction of a solar panel ready tile of FIG. 1; consisting of a solar panel ready tile body 421 (with a cavity or a docking system 427 to receive solar panel unit 447, 457 or 467, self-cleaning brush system 429, power and communication pathway connection plugs within the cavity or docking system 417 and extremities 413, 415 of the tile), three embodiments of solar panel units 447, 457 and 467 with capabilities of self-rotation for self-cleaning (and optionally with capabilities of altitude and azimuth rotations) that snugly fits into the cavity or docking system 427 and a water proof solar panel outer lid 473, in accordance with an embodiment of the present invention.

The solar panel ready tile body 421 comes with a shape of curvatures, which may be suitable for some specific house architectures (that is, to enhance the looks of houses). In addition, this particular design the solar panel ready tile body 421 allows a self-cleaning brush system 429 built into it very easily. Again, the solar panel ready tile body 421 may be made up of any of the commercially available materials (such as clay, plastic or glass) and may be with industry standard specifications. In other words, each of the dimensional specifications (such as length, width, height and curvatures, externally and internal to the cavity or docking system 427) of the solar panel ready tile body 421 may be set as an industry standard and is manufactured according to these standard dimensions. Some of the solar panel ready tile bodies 421 that fit into the edges of the roof or on the top most edge of the roof may have slightly different designs from the one illustrated 421.

In addition, the power and communication pathway connection plug locations within the cavity or docking system 417 and extremities 413, 415 (and below of 423 and 425) of the solar panel ready tile body 421 may also be set as industry standards. Thus, the power and communication pathway connection plugs 413, 415 (and below of 423 and 425) at the extremities of the solar panel ready tile body 421 electrically attach to the neighboring tiles on all sides (top, bottom and left and right sides), some of which may be redundant connections. The internal wiring between the power and communication pathway connection plug locations within the cavity or docking system 417 and extremities 413, 415 (and below of 423 and 425) of the solar panel ready tile body 421 may be made during the assembly of the solar panel ready tile body 421, solar panel unit 447, 457 or 467 and water proof solar panel outer lid 473, into a single solar panel ready tile.

In the illustration, three embodiments of solar panel units 447, 457 and 467 are shown. The power and communication pathway connection plugs may be located within the shaft 445, 455 or 465 located at the center (along the axis of the cylinder 447, 457 or 467). The solar panel unit 447, 457 or 467 is capable of rotation (with a motor system, for instance) along the axis and within the cavity or docking system 427 for self-cleaning purposes.

While dimensions (such as length and diameter) of the solar panel units 447, 457 and 467 may be industry standard, the internal electronic design architecture of the solar panel unit 447, 457 or 467 may vary widely. The internal electronic architecture may depend on the corresponding manufacturer; the illustration shows three such embodiments 447, 457 and 467. The illustration of the solar panel unit 447, 457 or 467 show a solar panel (photo voltaic cell) array 441, 451 or 461, sub-panel control module 443, 453 or 463 and connection plugs 445, 455 or 465 respectively.

Each of the dimensional specifications (such as length, width, and height) of the transparent and water proof solar panel outer lid 473 may also be set as an industry standard. The transparent and water proof solar panel outer lid 473 may be made up of glass or plastic materials. The transparent and water proof solar panel outer lid 473 has a snap-in or screw-in attachment system 471, and removably attaches and seals the solar panel ready tile body 421, after the solar panel unit 447, 457 or 467 is put in place inside the cavity or docking system 427.

Figure 5:
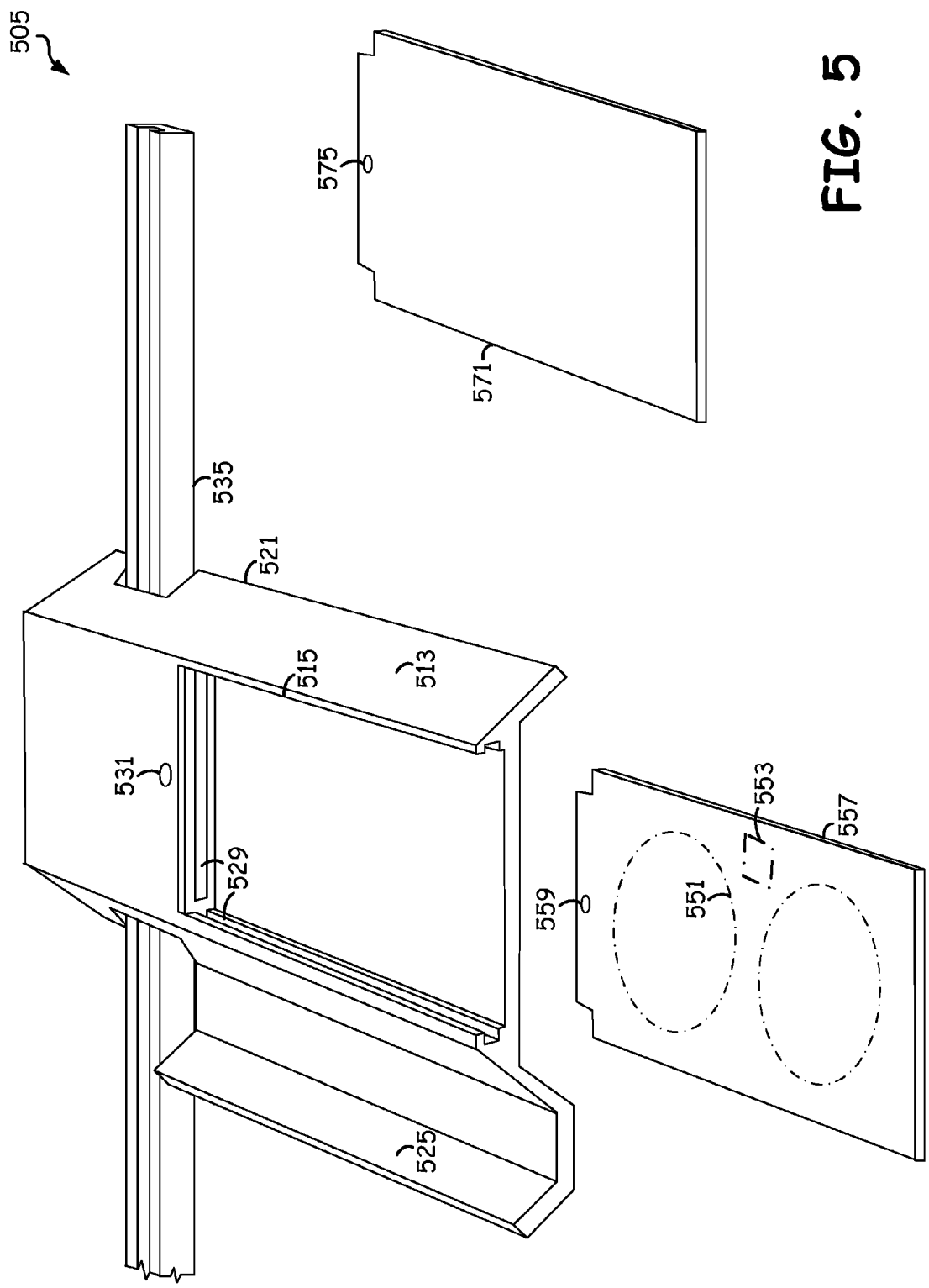
FIG. 5 is a perspective diagram illustrating construction of a solar panel ready tile of FIG. 1; consisting of a solar panel ready tile body (with a cavity or a docking system to receive a solar panel unit) that fits into a roof batten, a solar panel unit that snugly fits into the cavity or docking system (and optionally with capabilities of altitude and azimuth rotations) and water proof solar panel outer lid, in accordance with an embodiment of the present invention.

FIG. 5 is a perspective diagram illustrating construction of a solar panel ready tile of FIG. 1; consisting of a solar panel ready tile body 521 (with a cavity or a docking system 515 to receive solar panel unit 557) that fits into a roof batten 535, solar panel unit 557 that snugly fits into the cavity or docking system 515 (and optionally with capabilities of altitude and azimuth rotations) and water proof solar panel outer lid 571, in accordance with an embodiment of the present invention.

In this embodiment of the present invention, the solar panel ready tile body 521 is designed to be mounted on a roof batten 535, but each of the dimensional specifications (such as length, width, height, base or bottom side design and dimensions and other design specifications) 521, including each of the dimensional specifications (such as length, width and height) of the cavity or a docking system 515 that receives the solar panel unit 557, may be set as an industry standard and manufactured according to those standard dimensions. The solar panel ready tile body 521 may be made up of any of the usual tile body materials that are commercially available (such as clay, plastic, or glass). In addition, some of the solar panel ready tile bodies 521 that fit into the edges of the roof or on the top most edge of the roof may have slightly different industry standard designs from the one illustrated 521.

In this embodiment, the solar panel unit 557 is designed to slide into the slot 529 of the cavity or docking system 515. In other words, both of solar panel unit 557 and (transparent and water proof) solar panel outer lid 571 (with the dimensional specifications such as length, width and height being that of industry standards; and being made up of glass or plastic materials) have slide-in and screw-in 559 and 575 attachment system, and removably attached and sealed to the solar panel ready tile body 521 by sliding in along the slot and screwing in at 531.

The solar panel unit 557 comes in standard dimensions of length, width and height, with top, bottom and left and right side power and communication pathway connection plug locations (not shown) set as industry standards. However, internal electronic design architecture of the solar panel unit 557 may vary widely and may depend on the corresponding manufacturers. The illustration of the solar panel unit 557 shows a solar panel (photo voltaic cell) array 551 and sub-panel control module 553.

The power and communication pathway connection plugs are located on all four sides within the cavity or docking system (not shown) and on all four sides of the extremities (including at locations 513 and 525, not shown in this illustration) of the solar panel ready tile body 521 and the locations are set as industry standards. Thus, the power and communication pathway connection plugs on all four sides of the extremities of the solar panel ready tile body 521 electrically attach to the neighboring tiles on all sides (top, bottom and left and right sides). The internal wiring between the power and communication pathway connection plug locations within the cavity or docking system and extremities (including at locations 513 and 525) of the solar panel ready tile body 521 may be made during the assembly of the solar panel ready tile body 521, solar panel unit 557 and water proof solar panel outer lid 573, into a single solar panel ready tile.

Figure 6:
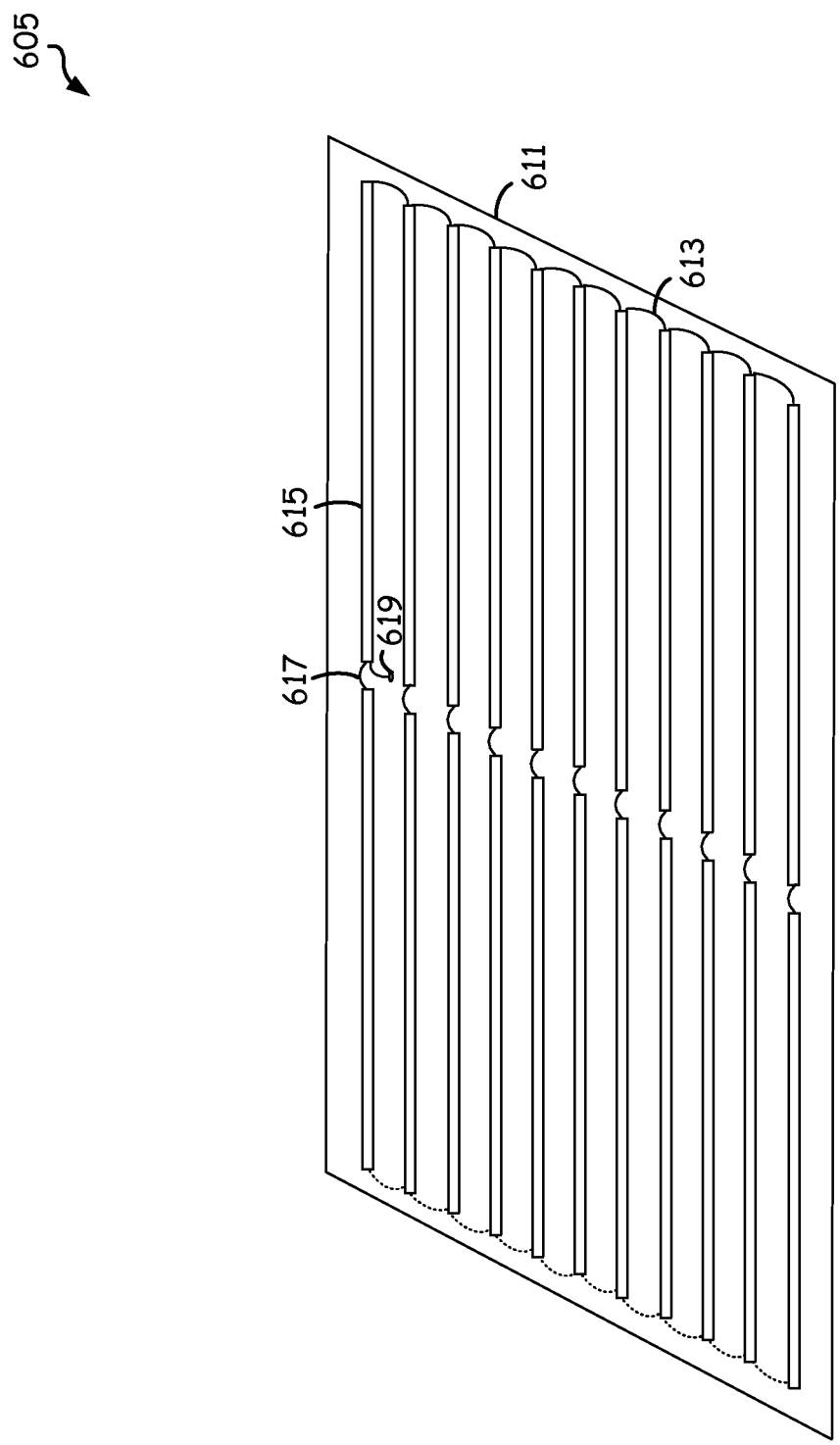
FIG. 6 is a perspective diagram illustrating wiring along roof battens that support the solar panel ready tiles of FIG. 1; consisting of power and communication pathway wiring housed in them, wherein one end of this wiring is connected to the individual solar panel units while the other end is connected to the central control unit, in accordance with an embodiment of the present invention.

FIG. 6 is a perspective diagram illustrating wiring along roof battens 611 that support the solar panel ready tiles of FIG. 1; consisting of power and communication pathway wiring 613, 617 housed in them, wherein one end of this wiring is connected to the individual solar panel units 619 while the other end is connected to the central control unit, in accordance with an embodiment of the present invention.

Some of the industry standard solar panel ready tiles, in accordance with some embodiments of the present invention, are designed to be mounted on series of roofing battens (refer to the FIG. 5 for more detailed description). These solar panel ready tiles may or may not come with connection plugs at the extremities that interconnect power and communication pathway wiring between the solar panel ready tiles. In these cases, where the solar panel ready tiles are designed to be mounted on roofing battens, the battens may carry concealed power and communication pathway wiring 613, 617 (inside series of conduit pipes 615 fixed to the roofing battens, that are invisible from within the house), as illustrated. The concealed power and communication pathway wiring 613, 617 at one end leads to each individual solar panel units at connection point 619 (that is, from the base side of the solar panel ready tiles), while the other end leads to a central control unit. The solar panel ready tiles may be designed to have connection plugs at the base side to connect to these concealed power and communication pathway wirings 613, 617 along the roofing battens 611.

In another embodiment, concealed power and communication pathway wirings may connect the connection plugs at the interior of the cavity or docking system to the connection plugs at the extremities (which in turn plug into the neighboring tiles, at left and right sides, top and bottom) as well as at the base side (which in turn plug into the concealed power and communication pathway wiring 613, 617 on the roofing batten via 619) of the solar panel ready tile body. Thus, the entire solar panel ready tiled roof becomes interconnected (with a redundant connection along the roofing batten for longevity). The concealed power and communication pathway wiring 613, 617 are used for plurality of purposes such as a panel array power bus, panel array communication pathway and/or panel array data pathway (each of which having its own connection plugs at the base of the solar panel ready roofing tile), all of which finally connect to the central control unit.

The concealed power and communication pathway wiring 613, 617 that is housed in a series of concealed conduit pipes 615, may be discreetly spaced every meter or so away from each other (lengthwise) and also along each of the roofing battens as illustrated, to make wiring 619 leading to the solar panel ready tiles possible.

Figure 7:
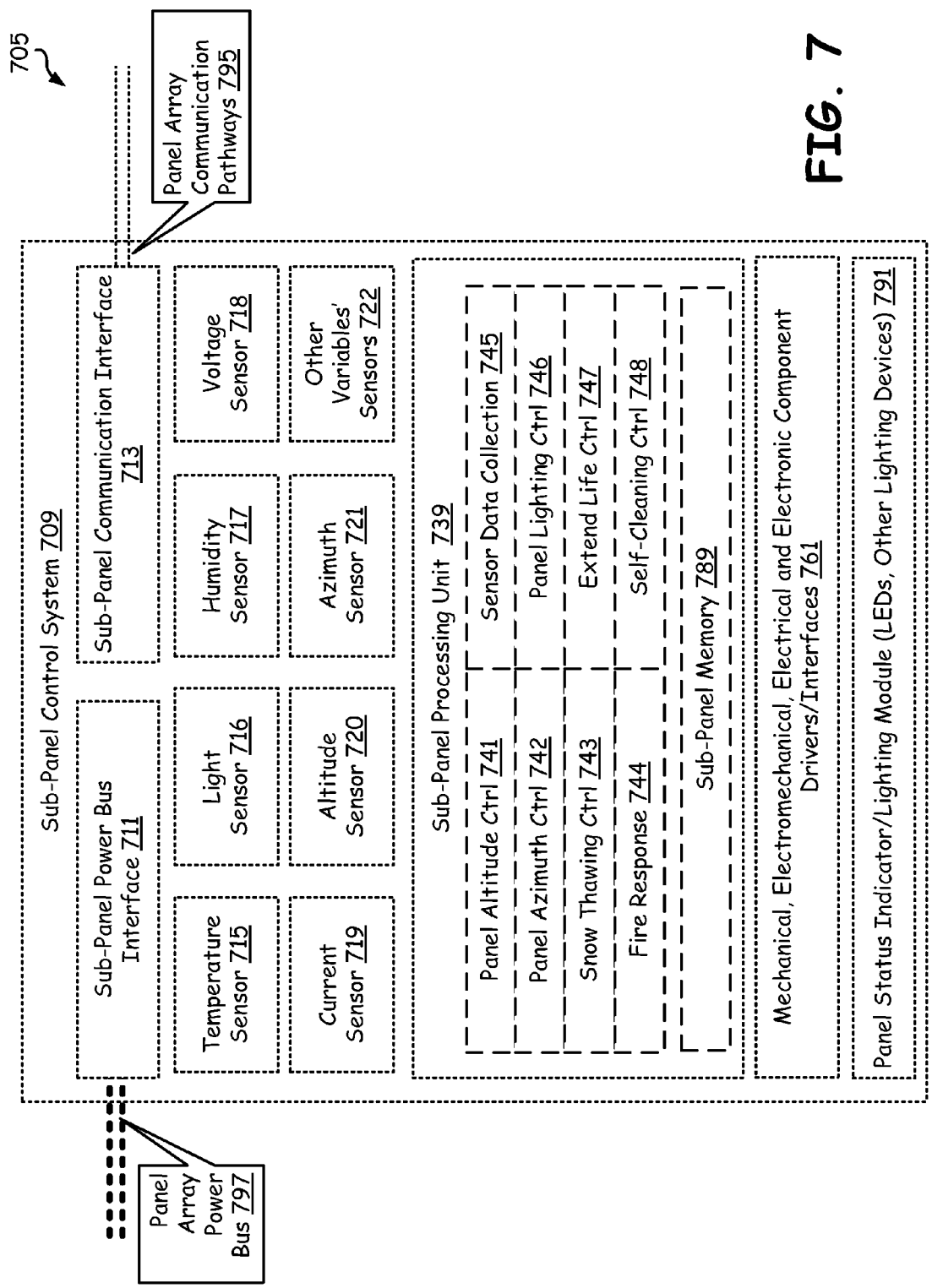
FIG. 7 is a schematic block diagram illustrating construction of an optional sub-panel control system (that is part of solar panel unit of the solar panel ready tile of FIG. 1), consisting of one or more of a sub-panel power bus interface, a sub-panel communication interface, a sub-panel processing unit with pluralities of programmable control processing capabilities, a sub-panel memory, a sub-panel status indicator lighting modules and decoration lighting modules and a plurality of sensors, in accordance with embodiment of the present invention.

FIG. 7 is a schematic block diagram illustrating construction of an optional sub-panel control system (that is part of solar panel unit of the solar panel ready tile of FIG. 1) 709, consisting of one or more of sub-panel power bus interface 711, sub-panel communication interface 713, sub-panel processing unit 739 with pluralities of programmable control processing capabilities 741 through 748, sub-panel memory 789, sub-panel status indicator lighting modules and decoration lighting modules 791 and a plurality of sensors 715 through 722, in accordance with an embodiment of the present invention.

In specific, a solar panel ready tile assembly (refer to the FIG. 1 through FIG. 5 for detailed descriptions) consists of a solar panel ready tile body (having a cavity, slot or docking system), solar panel unit and water proof solar panel outer lid; all of which are permanently or removably (with snap-in, slide-in or screw-in removable attachment systems) assembled together in to a waterproof single unit. The inside of the cavity or docking system (covered by the water proof solar panel outer lid) may contain a plurality of mechanical, electromechanical, electrical as well as electronic components, preferably assembled on a single solar panel unit board, for ease of installation and maintenance.

In one embodiment, these mechanical, electromechanical, electrical and electronic components include one or more of: (i) An array of photo voltaic cells or any other solar power generation cells, distributed along with proper interconnections; (ii) Power bus driver connected to each of the array of photo voltaic cells or any other solar power generation cells; (iii) Azimuth and altitude positional control units (via hydraulic, stepper or motor units) attached to the solar panel unit; (iv) Solar energy focusing lenses attached to the array of photo voltaic cells or any other solar power generation cells; (v) Cooling systems attached to the array of photo voltaic cells or any other solar power generation cells; (vi) Sub-panel array power busses, electrically connected to each of the pluralities of photo voltaic cells or any other solar power generation cells, via power bus drivers; and (vii) Sub-panel power connection plugs (which come in standard sizes and locations of the solar panel unit) at the edges of the solar panel unit board, which are electrically connected to the solar panel unit's sub-panel array power bus. In this embodiment, the optional sub-panel control system 709 may not exist, and all of the above mentioned mechanical, electromechanical, electrical and electronic components may be controlled directly by a central control unit.

In addition to some of the above mentioned essential components, in more embodiments of the solar panel ready tiles, the mechanical, electromechanical, electrical and electronic components may include one or more of: (viii) Sub-panel control module 709 placed in the solar panel unit or adjacent to it; (ix) Sub-panel communication pathways, communicatively coupled to the sub-panel control system 709; (x) Sub-panel communication connection plugs at the edges of the board, which are communicatively coupled to the sub-panel communication pathways; (xi) Sub-panel status indicator lighting modules and decoration lighting modules, which are placed somewhere at the edges of the solar panel unit board or adjacent to the solar panel unit board, and communicatively coupled to the sub-panel communication pathways; (xii) Sub-panel sensor modules (such as temperature 715, light 716, humidity 717, voltage 718, current 719, altitude 720 and azimuth 721 and other variable sensors 722), which are placed somewhere within the transparent water proof solar panel outer lid (or covering), and communicatively coupled to the sub-panel communication pathways; (xiii) Sub-panel snow thawing modules (along with light and temperature sensors), which contain heating elements, placed inside the water proof solar panel outer lid, to thaw snow during winters; and (xiv) Sub-panel over load and fire response modules (along with smoke and surge sensors), for safety purposes.

The (optional) sub-panel control system 709 (that is part of the solar panel units or placed adjacent to the solar panel units on the same board) may consist of one or more of: (i) Sub-panel power bus interface 711, communicatively coupled to the central control unit via panel array power bus 797; (ii) Sub-panel communication interface 713, communicatively coupled to the central control unit via panel array communication pathways 795; (iii) Sub-panel processing unit 739, with pluralities of programmable control processing capabilities 741 through 748; (iv) Sub-panel memory 789; (v) Plurality of sub-panel of sensors (such as temperature 715, light 716, humidity 717, voltage 718, current 719, altitude 720 and azimuth 721, smoke and other variable sensors 722); (vi) Plurality of sub-panel of status indicator lighting and decoration lighting bulbs (such as LEDs) 791; (vii) Sub-panel status indicator lighting modules and decoration lighting control interfaces 761; (viii) Sub-panel sensor control interfaces 761; (ix) Sub-panel snow thawing control interfaces 761; (x) Sub-panel azimuth and altitude control interfaces 761; (xi) Sub-panel self cleaning rotational control interfaces 761; and (xii) Sub-panel over loading and fire response control interfaces 761. Each of the sub-panel control systems 709, in turn, may be individually programmed by the central control unit (via a computing system or externally via servers), for any of the above said functionalities.

The pluralities of programmable control processing capabilities (that is, embedded digital signal processing programs or remotely programmed digital signal processing programs via the central control unit, with limited processing capabilities) of the sub-panel processing unit 739 may include programs for one or more of: (i) Temperature, light, humidity, voltage, current, power, altitude and azimuth, smoke, surge and other variable sensor data collection; (ii) Mechanical, electromechanical, electrical and electronic component feedback controls; (iii) Status indicator lighting and decoration lighting controls; (iv) Snow thawing controls; (v) Solar panel unit azimuth and altitude controls for optimal power generation; (vi) self cleaning rotational controls; and (vii) Over loading and fire response controls. In particular, the sub-panel processing unit 739 is capable of supporting panel altitude control 741, panel azimuth control 742, snow thawing control 743, fire response control 744, sensor data collection 745, panel lighting control 746, panel life extension control 747, and self cleaning control. To support these operations, the sub-panel processing unit may include sub-panel memory 789, which may be one or more of RAM, ROM, magnetic memory, and/or other type of memory.

In some embodiments of the roofing tile solar power generation system, to cut costs, for given set of tiles in a region, only one of the solar panel ready tiles may include all of these features (that is, it is sufficient to have some of these features available only in one tile in a block of tiles, within a roofing tile solar power generation system, have all these above mentioned features). In other words, even when having all of the above mentioned features, the mechanical, electromechanical, electrical and electronic components (including the sub-panel control system 709) may be employed in a distributed manner within a given region of the roofing tile solar power generation system.

Figure 8:
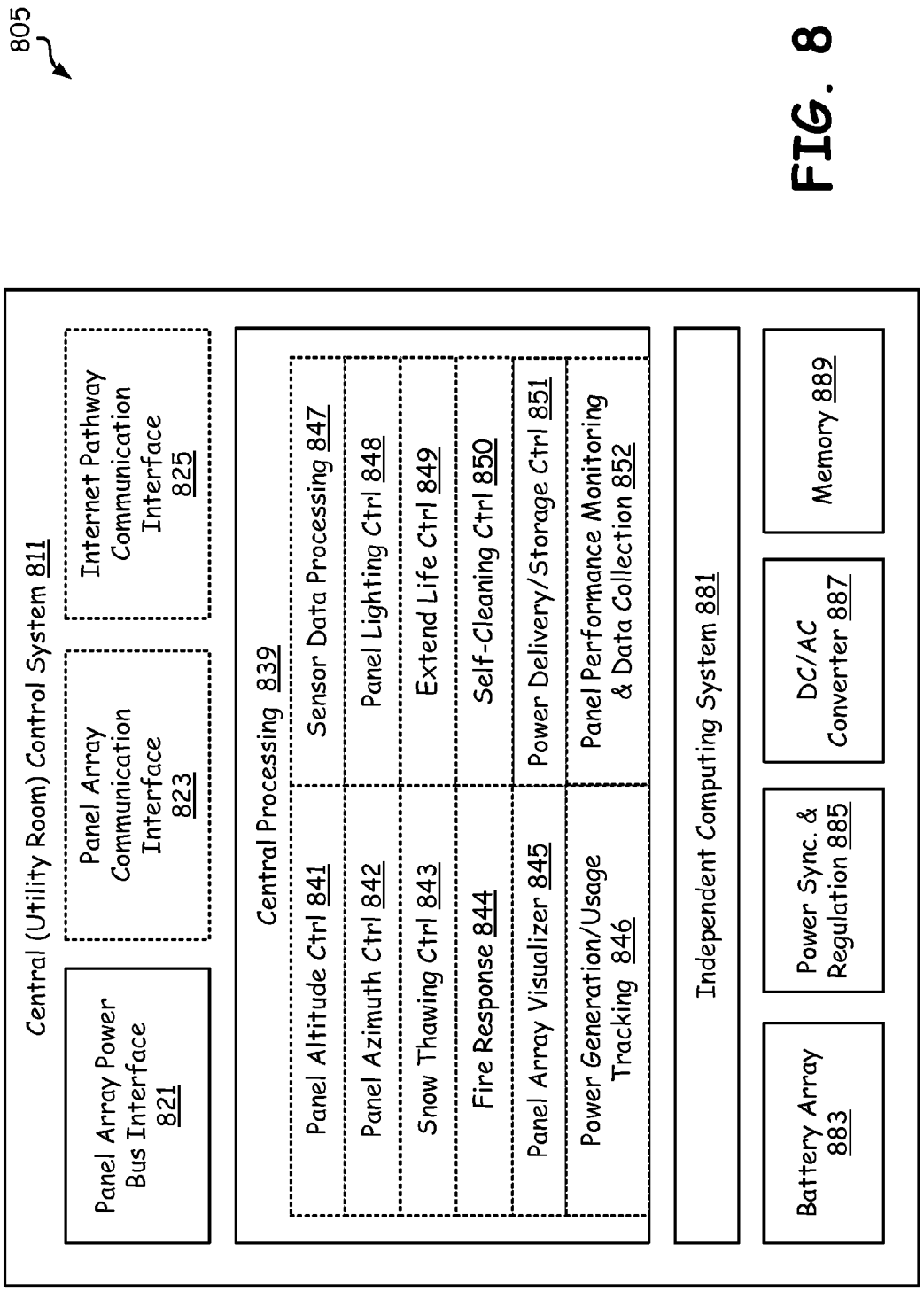
FIG. 8 is a schematic block diagram illustrating construction of the central control unit (placed in a safe location within the house) of FIG. 1, consisting of one or more of panel array power bus interface, panel array communication interface, Internet pathway communication interface, central processing unit with pluralities of programmable control processing capabilities, an independent computing system, battery array, power synchronization and regulation unit, DC/AC converter and memory, in accordance with an embodiment of the present invention.

FIG. 8 is a schematic block diagram illustrating construction of the central control unit 811 (placed in a safe location within a house, for example) of FIG. 1, consisting of one or more of panel array power bus interface 821, panel array communication interface 823, Internet pathway communication interface 825, central processing unit 839 with pluralities of programmable control processing capabilities, an independent computing system 881, battery array 883, power synchronization and regulation unit 885, DC/AC converter 887 and memory 889, in accordance with an embodiment of the present invention.

The central control unit 811 may be located in any safe place (such as utility room) within the house, and has built-in automatic feedback control capability as well as manual control capability (with operational control options settings provided via the independent computing system to the owner of the house, or provided to an external maintenance contractor who is remotely located and operates via Internet and servers) to control mechanical, electromechanical, electrical and electronic components (refer to the FIG. 7 description for more details) within each of the solar panel ready tiles. These automatic feedback control or manual control processes may include one or more of: (i) Controlling the array of solar power generation cells, for optimal power generation; (iii) Controlling azimuth and altitude positional hydraulic, stepper or motor units, attached to the solar panel unit; (iii) Controlling cooling systems attached to the solar power generation cells; (iv) Programming, controlling and gathering data from the sub-panel control module; (v) Controlling sub-panel status indicator lighting modules and decoration lighting modules; (vi) Gathering data from sub-panel sensor modules (such as temperature, light, humidity, voltage, current, altitude and azimuth, and other variable sensor modules); (vii) Controlling sub-panel snow thawing modules (along with light and temperature sensors), which contain heating elements; and (viii) Controlling sub-panel over load and fire response modules (along with smoke and surge sensors).

In a simpler embodiment, the central control unit 811 is electrically connected to each of the arrays of photo voltaic cells or any other solar power generation cells in each of the plurality of solar panel units at the roof via the panel array power busses via power bus drivers. In this case, the central control unit 811 directly controls each of the solar panel units for optimal power generation. In a more advanced embodiment, the central control unit 811 is communicatively coupled via the panel array communication pathways and electrically connected via the panel array power busses, to the optional sub-panel control system of each of the plurality of solar panel units. In this case, the central control unit 811 may control or program the optional sub-panel control system, based upon the operational control options settings performed by a user via a computing system 881 or externally via external servers.

To perform above mentioned automatic feedback controls or manual controls, the central control unit 811 includes one or more of: (i) Panel array power bus interface 821; (ii) Panel array communication interface 823; (ii) Internet pathway communication interface 825; (iv) Central processing unit 839 with pluralities of programmable control processing capabilities; (v) Memory units 889; (vi) Battery arrays 883; (vii) Power synchronization and regulation units 885; and (viii) DC/AC Converters 887. The central processing unit's 839 control processing programs and capabilities include temperature, light, humidity, voltage, current, power, altitude and azimuth, smoke, surge and other variable sensor data collection and processing capabilities 847 and feedback controls of appropriate mechanical, electromechanical, electrical and electronic components based upon this data and processing. In addition, the central processing unit 839 may also contain programs to perform (based upon operational control options settings) status indicator lighting and decoration lighting controls 848, snow thawing controls 843, PV cells azimuth 842 and altitude 841 controls for optimal power generation, self cleaning rotational controls 850, over loading and fire response controls 844, power delivery and storage controls 851, power generation and usage tracking 846, extended panel life control 849, panel array visualizer controls 845 and panel performance monitoring and data collection 852. The panel array visualizer 845 provides on screen display of each section of the solar panel ready tiles along with relevant data and analysis; and upon clicking on any solar panel ready tile in the display, provides on screen display of relevant data and analysis pertaining to that particular solar panel ready tile.

Figure 9:
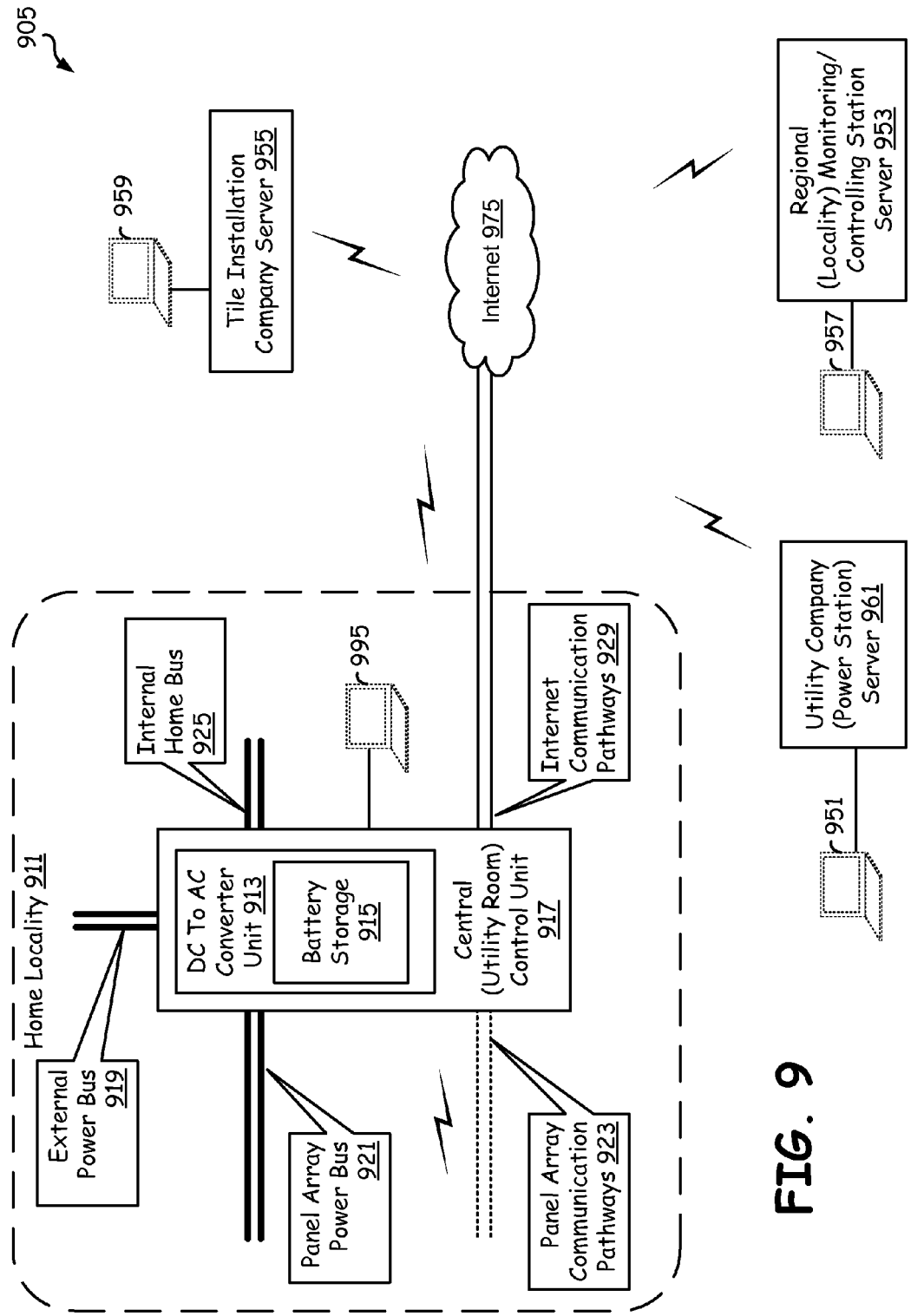
FIG. 9 is a system diagram illustrating construction of a roofing tile solar power generation system within a house locality, corresponding wiring and internal and external control systems; consisting of one or more of panel array power buses, panel array communication pathways, Internet communication pathways, external and internal power busses, a central control unit, and external control systems via Internet, in accordance with an embodiment of the present invention.

FIG. 9 is a schematic block diagram illustrating construction of a roofing tile solar power generation system within a house locality 911, corresponding wiring, and internal and external control systems; consisting of one or more of panel array power bus 921, panel array communication pathways 923, Internet communication pathways 929, external and internal power busses 919 and 925, a central control unit 917, and external control systems 953, 955 and 961 via Internet 975, in accordance with an embodiment of the present invention.

The home locality 911 of a roofing tile solar power generation system consists of a roof of the house tiled with solar panel ready tiles (not shown, interconnected using connection plugs and/or via battens), panel array power bus 921 and wired or wireless panel array communication pathways 923 that lead to the central (utility room) control unit 917, an external power bus 919 that leads to the central (utility room) control unit 917 and wired or wireless Internet communication pathways 929 that lead to the local Internet backbone 975 (via an access point, for instance). The central control unit 917, in turn, consists of a plurality of data collection, analysis, control processing and controlling capabilities (refer to the FIGS. 7 and 8, for detailed descriptions) to control the functionalities of the roofing tile solar power generation system, a battery storage 915 (to store excess power generated by the roofing tile solar power generation system) and an AC/DC converter unit 913 (that converts DC power generated by the solar panel ready tiles to AC, for house consumption via 925 or for delivery to an external grid via 919).

The central control system's 917 functions may be monitored and controlled either locally by a computing system 995, or externally (via servers) by various agency servers that may include utility company (power station) server 961 and computing system 951, regional (locality) monitoring/controlling station server 953 and computing system 957, and tile installation company server 955 and computing system 959. Each of these external monitoring agencies 961, 953 or 955 may have a prepaid contract with the owner to monitor proper functioning of the roofing tile solar power generation system (and thus having limited monitoring and controlling capabilities assigned to them) within a neighborhood. In addition, they may be able to tap excess power from the roofing tile solar power generation system to be delivered to the main power grid or to the neighborhood by financially compensating the owner of the roofing tile solar power generation system (and thus having limited monitoring and controlling capabilities assigned to them).

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A roofing tile comprising:
a solar panel ready tile body;
a cavity formed in the solar panel ready tile body;
a cylindrical solar panel unit installed in the cavity, the cylindrical solar panel unit configured to rotate about a central axis;
the cylindrical solar panel unit comprising a local computing system configured to control the cylindrical solar panel unit based on a program of instructions received from a remote server;
a brush system attached to an inner bottom surface of the cavity and substantially aligned with the central axis of the cylindrical solar panel unit, the brush system configured to clean at least a part of the cylindrical solar panel unit;
a water proof solar panel outer lid that substantially seals the cavity with respect to the solar panel ready tile body;
a first electrical connection formed in the cavity;
a second electrical connection located on an extremity of the solar panel ready tile body;
at least one insulated conductor coupled to the first electrical connection and to the second electrical connection; and
wherein each of the first electrical connection and the second electrical connection includes at least three separate individual connections including:
a separate individual power connection configured to carry electricity generated by the solar panel unit,
a separate individual control signal connection configured to carry control signals from the remote server to the solar panel unit, and
a separate individual data signal connection configured to carry data signals from the solar panel unit to the remote server.

2. The roofing tile of claim 1, wherein:
the solar panel ready tile body is formed of a first material; and
the water proof solar panel outer lid is formed of a second material that differs from the first material.

3. The roofing tile of claim 1, wherein the solar panel ready tile body and the water proof solar panel outer lid are formed of the same material.

4. The roofing tile of claim 1, wherein the solar panel ready tile body and the water proof solar panel outer lid are formed of the two materials of similar appearance.

5. The roofing tile of claim 1, further comprising a fluid conduit extending from the cavity to an extremity of the tile.

6. The roofing tile of claim 1, the brush system configured to clean at least a part of the cylindrical solar panel unit as the cylindrical solar panel unit rotates about the central axis.

7. The roofing tile of claim 1, the cylindrical solar panel unit is configured to self-clean by rotating about the central axis such that at least a part of the cylindrical solar panel unit is cleaned by the brush system.

8. A roofing tile comprising:
a tile body;
a replaceable cylindrical photovoltaic module configured to rotate about a central axis;
the replaceable cylindrical photovoltaic module comprising a control module configured to control the replaceable cylindrical photovoltaic module based on a program of instructions received from a central control unit;
a cavity formed in the tile body, the cavity including a docking system docked with the replaceable cylindrical photovoltaic module;
a brush system attached to an inner bottom surface of the cavity and substantially aligned with the central axis of the replaceable cylindrical photovoltaic module, the brush system configured to clean at least a part of the replaceable cylindrical photovoltaic module;
a removable waterproof solar panel outer covering removably engaged with the cavity that substantially seals the cavity;
a first electrical connection formed in the cavity;
a second electrical connection located on an extremity of the tile body;
at least one insulated conductor coupled to the first electrical connection and to the second electrical connection; and
wherein each of the first electrical connection and the second electrical connection includes at least three separate individual connections including:

a separate individual power connection configured to carry electricity generated by the replaceable cylindrical photovoltaic module, a separate individual control signal connection configured to carry control signals from the central control unit to the replaceable cylindrical photovoltaic module, and a separate individual data signal connection configured to carry data signals from the replaceable cylindrical photovoltaic module to the central control unit.

9. The roofing tile of claim 8, wherein the docking system mechanically holds the replaceable cylindrical photovoltaic module.

10. The roofing tile of claim 8, wherein the removable covering is attached and removable, respectively, by one of the group consisting of:

screwing and unscrewing;
snapping-in and unsnapping; and
sliding-in and un-sliding.

11. The roofing tile of claim 8, the brush system configured to clean the replaceable cylindrical photovoltaic module based upon the replaceable cylindrical photovoltaic module rotating about the central axis.

12. The roofing tile of claim 8, comprising:

at least one azimuth and altitude positional control unit programmed to:

attach to the replaceable cylindrical photovoltaic module such that the positional control unit physically controls the altitude and azimuth of the replaceable cylindrical photovoltaic module to optimize power generation by the replaceable cylindrical photovoltaic module; and in response to receiving a command from the control module via an azimuth and altitude control interface local to the control module, change at least one of the azimuth and altitude of the replaceable cylindrical photovoltaic module to optimize power generation by the replaceable cylindrical photovoltaic module, wherein:

the command is generated by a processing unit within the control module as directed by a program of instructions stored in the control module, the program of instructions received by the control module from a central control unit via a communications interface local to the control module.

13. A roofing tile solar power generation system comprising:

a plurality of solar panel ready tile bodies mounted on a series of battens upon the roof of a house;

a plurality of cylindrical solar panel array units, each cylindrical solar panel array unit is fitted to a separate individual one of the plurality of solar panel ready tile bodies and is configured to rotate about a central axis;

each cylindrical solar panel array unit comprising a control module configured to control the cylindrical solar panel array unit based on a program of instructions received from a central control unit;

a cavity formed in each of the pluralities of solar panel ready tile bodies, each cavity including a docking system fitted with a separate individual one of the plurality of cylindrical solar panel array units;

a brush system attached to an inner bottom surface of the cavity and substantially aligned with the central axis of the cylindrical solar panel array unit, the brush system configured to clean at least a part of the cylindrical solar panel array unit;

a removable water proof solar panel outer lid fixed into each of the pluralities of solar panel ready tile bodies, that substantially seals the docking system;

the docking system removably docking with the cylindrical solar panel array unit at any time after installation of each of the pluralities of solar panel ready tile bodies;

the docking system removably sealed with the water proof solar panel outer lid to substantially seal the docking system; and each of the pluralities of solar panel ready tile bodies comprising:

a first electrical connection formed in the cavity;

a second electrical connection located on an extremity of the solar panel ready tile body;

at least one insulated conductor coupled to the first electrical connection and to the second electrical connection; and wherein each of the first electrical connection and the second electrical connection includes at least three separate individual connections including:

a separate individual power connection configured to carry electricity generated by the cylindrical solar panel array unit, a separate individual control signal connection configured to carry control signals from the central control unit to the cylindrical solar panel array unit, and a separate individual data signal connection configured to carry data signals from the cylindrical solar panel array unit to the central control unit.

14. The roofing tile solar power generation system of claim 13, the control module comprising:

a power bus interface, coupled to a panel array power bus, configured to deliver electrical power generated by the cylindrical solar panel array unit to the central control unit via the panel array power bus, a communications interface, coupled to a panel array communication pathway, configured to receive a program of instructions from the central control unit via the communications pathway, a processing unit programmed to support azimuth control and altitude control of the cylindrical solar panel array unit as directed by the program of instructions received from the central control unit; and a component interface configured to control the azimuth and altitude of the cylindrical solar panel array unit as directed by the processing unit.

15. The roofing tile solar power generation system of claim 14, the central control unit comprising:

a panel array power bus coupled to the power bus interface in a cylindrical solar panel array unit control system via the panel array power bus, the panel array power bus configured to receive electricity generated by the cylindrical solar panel array unit, an internet pathway communication interface coupled to a remote server via an internet communication pathway, the internet pathway communication interface programmed to receive operational control settings regarding the positioning of the cylindrical solar panel array, a central processing unit programmed to, based upon the operational control settings received from the remote server, develop a program of instructions for controlling azimuth and altitude of the cylindrical solar panel array, and a panel array communication interface coupled to the communication interface in the cylindrical solar panel array unit control system via the panel array communication pathway, the panel array communication interface configured to deliver the program of instructions to the cylindrical solar panel array unit control system.

16. The roofing tile solar power generation system of claim 15, wherein each of the series of battens upon the roof, carrying the panel array power bus, are electrically connected to the cylindrical solar panel array unit.

17. The roofing tile solar power generation system of claim 15, wherein each of the series of battens upon the roof, carrying the panel array communication pathways, are communicatively coupled to the cylindrical solar panel array unit.

18. The roofing tile solar power generation system of claim 15, wherein the central control unit:
- stores the optimally generated power in a battery array;
- delivers power to the house, based upon the operational control options settings; and
- delivers power to a local grid, based upon the operational control options settings.

* * * * *